United States Patent Office 2,771,420
Patented Nov. 20, 1956

2,771,420
DRILLING FLUID

David A. Rowe, Houston, Tex., assignor to Sun Oil Company, Philadelphia, Pa., a corporation of New Jersey No Drawing. Application February 24, 1953,
Serial No. 338,591

14 Claims. (Cl. 252—8.5)

This invention relates to the drilling of oil or gas wells and more particularly relates to improved drilling fluid especially useful in the drilling of high temperature wells.

Conventional aqueous drilling fluids or muds comprise a hydratable clay, such as bentonite, dispersed in water. The clay imparts to the drilling fluid viscosity and gelation characteristics necessary for proper functioning of the fluid during the drilling operation. A suitable weighting agent, such as barytes, may be added to raise the density of the drilling mud to the desired level.

Bentonite or other hydratable clays conventionally used in preparing drilling fluids are considered normally as being in the sodium base form. During the drilling of a well the mud is apt to become contaminated by calcium containing compounds, such as limestone, gypsum, anhydrite and cement. This type of contamination causes the clay to convert by ion exchange from its sodium base form to the calcium base form, as a result of which the viscosity and gelation characteristic of the mud may increase to such extent as to cause difficulties in further drilling. It is customary practice to treat the mud in such case with a viscosity controlling agent, such as various phosphate compounds, quebracho, lignin, tannin and the like, which acts as a dispersant for the clay particles. This treatment, however, is not always effective for controlling or regulating the viscosity and gelation characteristics of the mud to the desired levels.

In recent years it has become increasingly more common practice to convert the drilling mud purposely to the calcium base form by treatment with lime and to regulate its viscosity and gelation characteristics by means of a suitable dispersant for the clay particles. Such muds are commonly referred to as lime base muds. The effectiveness of the dispersant in reducing viscosity of this type of mud depends upon the pH value of the mud being relatively high and accordingly caustic soda is generally added to regulate its pH value to above 10. These lime base muds when properly prepared are advantageous in being insensitive to contamination by calcium compounds and in being less affected by build-up in solids content of the mud during the drilling operation.

The preparation of a lime base drilling fluid of particular utility is described in Barnes Pat. No. 2,491,436. According to that disclosure, the hydratable clay is converted by means of lime to the calcium base form and a lignosulfonate, such as calcium or sodium lignosulfonate, is added as the clay dispersant for regulating the viscosity and gelation characteristics.

While these so-called lime base muds have attained wide application in well drilling practice, they have been found to have certain disadvantages which limit their usefulness. A major difficulty which has been encountered results from a tendency for this type of mud to solidify upon standing quiescent at high temperature. When circulation of the mud, during the general course of drilling a well, is stopped for a time, the mud may set-up like cement under the influence of the formation temperature and thus become solid in the borehole. This tendency increases as the temperature rises, so that solidification within the borehole becomes particularly troublesome in drilling deep wells where relatively high temperatures are encountered and in some instances may even completely stop the drilling.

A second disadvantage in the use of lime base muds is that the process of converting the clay from the sodium to calcium form by means of lime generally entails an inordinate increase in viscosity of the mud before this property is finally reduced to the desired level by means of the dispersant. This means that at some stage during the conversion process, the mud may become very difficult to pump. For example, in converting a conventional field mud by means of lime and calcium lignosulfonate, these two treating agents are generally added together along with caustic soda; but nevertheless, there is a large increase in viscosity of the composition during the initial mixing stage and it is only after a time of mixing that the lignosulfonate dispersant exerts its influence in reducing viscosity to the desired value. As a practical matter in field operation, pumping of the mud composition during this initial mixing stage may be very difficult.

The present invention is directed to and provides an improved calcium base drilling fluid which avoids the above discussed disadvantages of prior drilling fluids of this type. The improved mud composition of the invention has little, if any, tendency toward solidification at high temperature and is not subject to inordinate increase in viscosity during its preparation.

The drilling fluid of the invention comprises an aqueous dispersion of hydratable clay in which the following have been incorporated:

(1) Calcium ions in sufficient amount to convert the clay substantially into its calcium base form, (2) an acetate or a formate anion in amount at least stoichiometrically equivalent to the calcium, (3) caustic soda in amount to raise the pH value of the mud above 10 but less than the stoichiometric equivalent of the acetate or formate anion, and (4) a clay dispersant in amount to substantially reduce viscosity.

There are a number of ways of preparing the drilling fluid so as to meet the requirements defined above. A preferred way is as follows. Starting with a conventional sodium base mud, calcium acetate is first mixed into the mud to convert the clay to the calcium form. The amount of calcium acetate required will depend on the clay content of the mud but generally will fall within the range of 1–10 lbs./bbl. During this conversion stage, viscosity of the mixture does not increase to any great extent, apparently due to the presence of the acetate ion. Caustic soda is then added in amount less than the stoichiometric proportion of the calcium acetate but sufficient to raise pH above 10, the amount generally being within the range of ½–5 lbs./bbl.; and calcium lignosulfonate is added along with the caustic soda in amount generally within the range of 1–10 lbs./bbl. A typical composition prepared in this manner may have incorporated in it 3–4 lbs./bbl. of calcium acetate, 1½–2 lbs./bbl. of caustic soda and 3–5 lbs./bbl. of calcium lignosulfonate, and may have a pH value ranging from 11.5 to 12.4.

Another preferred composition can be prepared in the same manner as described above except that calcium formate is substituted for the calcium acetate. The formate and acetate anions function similarly for the purpose of the present invention and can be considered interchangeable.

Another manner of preparing the drilling fluid is to add to the conventional sodium base mud sodium acetate and then incorporate lime and calcium lignosulfonate in the mixture. The proportions of materials added are adjusted to meet the conditions hereinbefore specified. It will be noted in this case that caustic soda is not actually added as such; but this procedure can be considered as equivalent to incorporating caustic soda in the composition, since sodium ions are provided by the acetate salt and hydroxyl ions are provided by the lime. This mode of preparing the drilling fluid is not as desirable as the one previously described, for the reason that some viscosity rise during mixing is apt to occur.

A further way of preparing the drilling fluid comprises treating the sodium base mud first with lime and caustic soda and then with acetic acid and calcium lignosulfonate. Still another way comprises adding to the mud calcium carbonate, then acetic acid and then caustic soda and calcium lignosulfonate. While these procedures eventually arrive at a mud composition having characteristics according to the invention, they are not preferred since they are more complicated and involve an inordinate rise in viscosity during initial mixing.

The best procedure thus involves merely the treatment of the sodium base mud with calcium acetate or calcium formate, followed by the addition of caustic soda and a suitable clay dispersant. The preferred dispersant is a lignosulfonate, which can be either an alkali metal or alkaline earth metal lignosulfonate. However, any other known or suitable clay dispersant which is soluble in the presence of calcium ions may be used, including such dispersants as quebracho, gallic acid, crude or pre-solubilized lignin, and tannins. Phosphate compounds are not dispersants under the conditions prevailing in the present drilling mud.

The following examples are by way of illustration and are not to be considered as necessarily limitative of the invention.

Example I

A conventional sodium base field mud was converted to a calcium base mud according to the invention by first mixing into the mud 6 lbs./bbl. of calcium acetate and then incorporating therein 3 lbs./bbl. of caustic soda and 4 lbs./bbl. of calcium lignosulfonate. This composition was designated as mud A. For comparison a conventional type of lime base mud, designated as mud B, was made by treating the same field mud with 10 lbs./bbl. of lime, 5 lbs./bbl. of calcium lignosulfonate and 1.5 lbs./bbl. of caustic soda. Weighting material was added to each of these compositions until the density was 14.0 lbs./gal.

The compositions then had the following properties:

|  | Mud A | Mud B |
|---|---|---|
| Stormer viscosity, cps | 24 | 28 |
| Initial gel strength, gms | 0 | 0 |
| 10 min. gel strength, gms | 5 | 20 |

Each of the muds was then heated and allowed to remain quiescent at 400° F. for times as indicated below, and observations of their behaviors were as follows:

| Time @ 400° F. | Mud A | Mud B |
|---|---|---|
| 24 hrs | fluid | solid |
| 48 hrs | do | |
| 60 hrs | do | |
| 120 hrs | slight gel | |
| 600 hrs | do | |

These results show that the mud composition according to the invention (mud A) had very much better stability characteristics at high temperature than the conventional lime base mud (mud B). Mud B turned solid within 24 hrs. whereas mud A developed only a slight gel even after 600 hrs. of heating.

Example II

Another field mud was subjected to three different treatments in each of which the mud was converted to calcium base form. Treatment No. 1 was a conventional conversion by means of lime whereas Nos. 2 and 3 were in accordance with the invention. The following tabulation shows the amounts of treating materials and the properties of the mud compositions:

|  | Field Mud | No. 1 | No. 2 | No. 3 |
|---|---|---|---|---|
| Materials added, lbs./bbl.: |  |  |  |  |
| calcium acetate |  |  | 5 | 2 |
| sodium acetate |  |  |  | 3 |
| lime |  | 12 |  | 3 |
| caustic soda |  | 2 | 2 | 2 |
| calcium lignosulfonate |  | 6 | 4 | 4 |
| pre-gelatinized starch |  |  | 2 | 2 |
| Properties: |  |  |  |  |
| weight, lbs./gel | 10.2 | 10.2 | 10.2 | 10.2 |
| Stormer viscosity, cps | 20 | 80 | 6 | 9 |
| initial gel, gms | 0 | 3 | 0 | 0 |
| 10 min. gel, gms | 30 | 150 | 3 | 0 |
| water loss, cc | 6.8 | 2.1 | 6.8 | 4.6 |
| pH | 8.5 | 12.3 | 11.7 | 11.7 |

The three treated mud samples were then heated in a bomb for 24 hrs. at about 357° F. At the end of this time, No. 1, the conventional lime base mud, was a plastic mass that could not be reconditioned for drilling mud use by any further treatment. Samples No. 2 and No. 3, however, were still satisfactory as drilling fluid and had the following properties:

|  | No. 2 (24 hr. heating) | No. 3 (24 hr. heating) |
|---|---|---|
| Stormer viscosity, cps | 92 | 118 |
| initial gel, gms | 20 | 35 |
| 10 min. gel, gms | 120 | 145 |
| water loss, cc | 35.5 | 26.5 |
| pH | 10.4 | 11.3 |

It will be noted that viscosity and gel characteristics increased somewhat under the high temperature condition and the pH value decreased, but the compositions did not become solid as did the conventional mud (No. 1). These compositions can be readily reconditioned for drilling mud use as shown in the succeeding example.

Example III

The heated mud designated No. 2 of the preceding example was reconditioned by treatment as shown below and was then reheated at about 357° F. for 24 hrs. After testing the product, it was reconditioned a second time by treatment as shown below and then was again heated at about 357° F. for 24 hrs. more. Again the product was tested, reconditioned and heated for 24 hrs. more. The amounts of reconditioning materials used and the properties of the mud immediately following the heating and then after the reconditioning treatments were as follows:

| Reconditioning materials, lbs./bbl. | 1st Reconditioning | 2nd Reconditioning | 3rd Reconditioning |
|---|---|---|---|
| calcium acetate | 1 | 1 | 1 |
| caustic soda | 1 | 1½ | 1 |
| calcium lignosulfonate | 1 | 1 | 1 |
| pre-gelatinized starch | 2 |  |  |

| Properties | 1st Reconditioning | | 2nd Reconditioning | | 3rd Reconditioning | |
|---|---|---|---|---|---|---|
|  | Before | After | Before | After | Before | After |
| Stormer viscosity, cps | 92 | 15 | 82 | 18 | 72 | 14 |
| initial gel, gms | 20 | 0 | 60 | 0 | 15 | 0 |
| 10 min. gel, gms | 120 | 10 | 85 | 20 | 45 | 5 |
| water loss, cc | 35.5 | 3.9 | 8.6 | 4.2 | 7.2 | 5.1 |
| pH | 10.4 | 11.8 | 8.6 | 11.9 | 9.1 | 11.9 |

From these results it is apparent that adverse changes in mud properties which may occur when the mud is subjected to high temperature conditions can readily be corrected by treating in the manner shown.

In drilling a well for gas or oil, general practice involves using a conventional sodium base mud in earlier stages of the drilling; and subsequently as conditions are encountered which may cause difficulties with this type of mud, it is converted to the calcium base form. From the foregoing description it is apparent that the present invention provides a means of converting to this form without encountering excessive viscosity rises during the conversion and it provides a calcium base mud composition which is adversely affected only to relatively small extent upon standing under high temperature conditions. High temperature does not cause solidification as with conventional calcium base muds but only a viscosity increase. Further, according to the invention, any adverse changes that do occur can readily be corrected by means of relatively small amounts of additives which can be introduced into the mud when circulation is resumed.

I claim:

1. A drilling fluid comprising an aqueous dispersion of hydratable clay in which the following have been incorporated: calcium ions in sufficient amount to convert the clay substantially into its calcium base form, an anion selected from the group consisting of acetate and formate ions in amount at least stoichiometrically equivalent to the calcium, caustic soda in amount sufficient to raise the pH value to above 10 but less than the stoichiometric equivalent of said anion, and an organically derived clay dispersant in amount to substantially reduce viscosity.

2. A drilling fluid comprising an aqueous dispersion of hydratable clay in which the following have been incorporated: calcium acetate in sufficient amount to convert the clay substantially into its calcium base form, caustic soda in amount less than the stoichiometric equivalent of the calcium acetate but sufficient to raise the pH value to above 10, and an organically derived clay dispersant in amount to substantially reduce viscosity.

3. A drilling mud according to claim 2 in which the dispersant is a lignosulfonate.

4. A drilling fluid comprising an aqueous dispersion of hydratable clay in which the following have been incorporated: calcium formate in sufficient amount to convert the clay substantially into its calcium base form, caustic soda in amount less than the stoichiometric equivalent of the calcium formate but sufficient to raise the pH value to above 10, and an organically derived clay dispersant in amount to substantially reduce viscosity.

5. A drilling mud according to claim 4 in which the dispersant is a lignosulfonate.

6. Method of treating a drilling fluid comprising a sodium base clay dispersed in water to produce a calcium base drilling fluid having improved stability at high temperature which comprises: converting the sodium base clay substantially to its calcium base form by means of calcium ions, incorporating in the drilling fluid an anion selected from the group consisting of acetate and formate ions in amount at least stoichiometrically equivalent to the calcium, adding caustic soda in amount sufficient to raise the pH value to above 10 but less than the stoichiometric equivalent of said anion, and adding an organically derived clay dispersant in amount to substantially reduce viscosity.

7. Method of treating a drilling fluid comprising a sodium base clay dispersed in water to produce a calcium base drilling fluid having improved stability at high temperature which comprises: converting the sodium base clay substantially to its calcium base form by means of calcium acetate, adding caustic soda in amount less than the stoichiometric equivalent of the calcium acetate but sufficient to raise the pH value to above 10, and incorporating in the drilling fluid an organically derived clay dispersant in amount to substantially reduce viscosity.

8. Method according to claim 7 in which the dispersant is a lignosulfonate.

9. In a well drilling operation wherein a drilling fluid comprising an aqueous dispersion of hydratable clay is introduced into the borehole, the method of preventing solidification of the drilling fluid under high temperature conditions which comprises introducing into the well such dispersion in which the following have been incorporated: calcium acetate in sufficient amount to convert the clay substantially into its calcium base form, caustic soda in amount sufficient to raise the pH value to above 10 but less than the stoichiometric equivalent of the calcium acetate, and an organically derived clay dispersant in amount to substantially reduce viscosity.

10. Method according to claim 9 in which the dispersant is a lignosulfonate.

11. Method of treating a drilling fluid comprising a sodium base clay dispersed in water to produce a calcium base drilling fluid having improved stability at high temperature which comprises: converting the sodium base clay substantially to its calcium base form by means of calcium formate, adding caustic soda in amount less than the stoichiometric equivalent of the calcium formate but sufficient to raise the pH value to above 10, and incorporating in the drilling fluid an organically derived clay dispersant in amount to substantially reduce viscosity.

12. Method according to claim 11 in which the dispersant is a lignosulfonate.

13. In a well drilling operation wherein a drilling fluid comprising an aqueous dispersion of hydratable clay is introduced into the borehole, the method of preventing solidification of the drilling fluid under high temperature conditions which comprises introducing into the well such dispersion in which the following have been incorporated: calcium formate in sufficient amount to convert the clay substantially into its calcium base form, caustic soda in amount sufficient to raise the pH value to above 10 but less than the stoichiometric equivalent of the calcium formate, and an organically derived clay dispersant in amount to substantially reduce viscosity.

14. Method according to claim 13 in which the dispersant is a lignosulfonate.

References Cited in the file of this patent

UNITED STATES PATENTS

| | | |
|---|---|---|
| 2,474,330 | Salathiel | June 28, 1949 |
| 2,491,436 | Barnes | Dec. 13, 1949 |
| 2,491,437 | Perkins | Dec. 13, 1949 |